United States Patent [19]

Ogoe et al.

[11] 4,402,780

[45] Sep. 6, 1983

[54] PROCESS FOR PREPARING LAMINATES WITH THERMOPLASTIC RESINS

[76] Inventors: Hiroyuki Ogoe, 5-1-402, 26 Sayamadai 3-chome, Sayama-shi, Saitama-ken; Hiroshi Ohta, 9-8 Kyoei-cho, Numazu-shi, Shizuoka-ken, both of Japan

[21] Appl. No.: 257,770

[22] Filed: Apr. 27, 1981

[51] Int. Cl.$^3$ .............................................. B29C 19/02
[52] U.S. Cl. ................................ 156/308.2; 156/280; 156/285; 156/272.2; 428/249; 428/252; 428/411; 428/510; 428/515; 428/537; 428/322.2
[58] Field of Search ............... 428/248, 249, 252, 240, 428/411, 412, 508, 510, 511, 514, 515, 520, 522, 535, 537; 156/272, 280, 285

[56] References Cited

FOREIGN PATENT DOCUMENTS 54-130686 10/1979 Japan ................................... 428/511
55-62930 5/1980 Japan ................................... 428/537

*Primary Examiner*—Marion McCamish
*Attorney, Agent, or Firm*—Wegner & Bretschneider

[57] ABSTRACT

The present invention concerns laminate articles comprising a plurality of basic material such as sheets of paper or cloth, to which a thermoplastic synthetic resin is impregnated and adhered and which are firmly joined mutually to be en bloc (a united body). Such a laminate article is obtained by impregnating a solution of a thermoplastic synthetic resin in an organic solvent, an aqueous emulsion or an aqueous suspension of the thermoplastic synthetic resin into a plurality of basic material such as sheets of paper or cloth, adhering an amount in a fixed range of the solid component of the thermoplastic resin to the basic material and laminating the plurality of the basic material under a pressure at a temperature higher than the melting point of the resin.

3 Claims, No Drawings

PROCESS FOR PREPARING LAMINATES WITH THERMOPLASTIC RESINS

SUMMARY OF THE INVENTION

The present invention concerns laminate articles comprising sheets of paper or of cloth into which a thermoplastic synthetic resin has been impregnated and adhered, and a process for preparing the same. The characteristic feature of the laminate articles according to the present invention is that a plurality of sheets of paper or cloth to which a thermoplastic synthetic resin has been impregnated and adhered as a solid component in an amount of 20 to 65% by weight of the finished sheets are laminated together with each other firmly into a united body of the article. The characteristic feature of the process for preparing the laminate articles according to the present invention is that a plurality of sheets of paper or cloth as the basic material, which have been impregnated with a solution of the thermoplastic synthetic resin in an organic solvent or an aqueous emulsion or an aqueous suspension of the resin to have 20 to 65% by weight of the resin (to the weight of the finished sheets) adhered to the basic material, are subjected to pressing at a temperature of higher than the melting point of the resin to obtain the laminate articles comprising a plurality of layer of the sheets firmly united with each other to be one unit body.

BACKGROUND OF THE INVENTION

Hitherto, it has been known that a laminate article impregnated with a thermosetting synthetic resin is obtained by laminating a plurality of sheets of paper or cloth impregnated with a varnish of primary condensate of a thermosetting synthetic resin such as phenol resin, urea resin, melamine resin, quanamine resin or epoxy resin and after evaporating the solvent for the primary condensate, pressing the laminate while heating the laminate to promote the condensation of the resin in order to harden the resin. The thus obtained laminate article impregnated with a thermosetting synthetic resin has been put to practical uses as plates, pipes and rods for a fairly long time.

However, in consideration of the necessity of saving resources and energy, the demand for articles made of synthetic resin has been diversified, for instance, the demand for products with water-proofness, higher surface hardness, higher mechanical strength, better processability and lighter weight has recently been increased so that the higherto publicly known laminate articles impregnated with a thermosetting synthetic resin are not necessarily possible to fully satisfy such a demand. Besides, in order to prepare the hitherto publicly known laminate article it is necessary to impregnate a varnish comprising the primary condensate of the resin into the basic material and to bring the impregnated primary condensate into further condensation. Accordingly, it is necessary to control the reaction conditions of the condensation according to the kinds of the resin used for the purposes, and such a control becomes to be a demerit because of its complicatedness. In addition, there is an economical demerit that the thermosetting resin is relatively expensive.

In consideration of these situation, there has been a raised demand for the articles of laminate impregnated with a thermoplastic synthetic resin with better processability and lighter weight.

However, since the viscosity of a solution of a thermoplastic synthetic resin in a solvent is, different from that of a primary condensate of a thermosetting synthetic resin, higher in proportion to its concentration and the permeability of such a solution into the basic material such as sheets of paper or cloth is not favorable due to the poor wetting property of the solution to the paper or cloth, it has been deemed to be difficult to prepare laminate articles impregnated with a thermoplastic synthetic resin up to present.

In other words, it has been believed that any practically utilizable articles cannot be obtained from the laminate material obtained by merely impregnating a solution of a thermoplastic synthetic resin into the basic material and laminating the thus impregnated basic material, because such an article is apt to be subjected to delamination.

The present inventors, as a result of studying the ways of putting a laminate article impregnated with a thermoplastic synthetic resin into practical use, have obtained an information that contrary to the above-mentioned usual recognition, sufficiently practicizable articles are possibly furnished by selecting the viscosity of the solution, emulsion or suspension of thermoplastic synthetic resin, the adhered amount of the resin impregnated to the basic material and the processing conditions of shaping the laminate articles, and thus attained the present invention.

DETAILED DESCRIPTION OF THE INVENTION

The main purpose of the present invention is to offer laminate articles impregnated with a thermoplastic synthetic resin, the articles being for use in several purposes. The other purposes of the present invention will be made clear from the following description.

In the present invention, the thermoplastic synthetic resin is used in the form of a solution in an organic solvent, of an aqueous emulsion or an aqueous suspension thereof. In the following description, the term of "aqueous emulsion" is used as the general term representing an aqueous emulsion itself and an aqueous suspension, and accordingly, hereinafter, the term "aqueous emulsion" is to be understood to include "aqueous suspension".

As the synthetic resin for use in the form of a solution in an organic solvent, those soluble in a volatile organic solvent to give a solution with fluidity may be utilized, for instance, polystyrene, copolymer of styrene and acrylonitrile, polymer of an ester of methacrylic acid, polyarylate, polycarbonate, polyvinyl chloride, copolymer of vinyl chloride and vinyl acetate, polyvinyl acetate, polyvinyl butyral and cellulose acetate are preferably enumerated. These resins may be used singly or as a mixture of two or more kinds.

In consideration of the availability and the usage of the waste, polystyrene and polyvinyl chloride are particularly preferable. However, polyvinyl chloride is a little inferior in its solubility in organic solvents. In addition, for articles to which mechanical strength is demanded, polycarbonate and polymethyl methacrylate are preferable.

As the resin for use in the state of an aqueous emulsion, the similar resin to those for use in the state of a solution in an organic solvent can be enumerated, and it may be used singly or a mixture of more than one kind of such resin may be used.

As the organic solvent for dissolving these resins, for instance, aromatic hydrocarbons such as benzene, chlorobenzene and toluene, aliphatic hydrocarbons such as dichloromethane and trichloroethylene, ketones such as acetone, ethyl methyl ketone, esters such as methyl acetate and ethyl acetate, and alcohols such as methanol and isopropyl alcohol are enumerable.

In dissolving the resin in such an organic solvent, it is preferable to use the resin in the state of flakes, sponges, films or powders from the viewpoint of its solubility, and the resin is dissolved at an ordinary temperature or under heating according to the kind of the resin. The concentration of the thus obtained solution of the resin in the organic solvent (hereinafter referred to as the solution of resin) is controlled to be lower than 30% by weight, preferably lower than 20% by weight, particularly more preferably 20 to 10% by weight from viewpoint of processability in impregnating. In addition, the viscosity of the solution of resin is preferably lower than 1000 cps, particularly lower than 800 cps. Namely, in the case of higher than 1000 cps, the impregnation of the solution of resin into the basic material such as sheet of paper or cloth is insufficient resulting in uneven impregnation and adherence of the resin into the whole basic material. In some cases, there are parts in basic material not having impregnated and adhered resin. However, since the wettability of the solution of resin to the basic material is improved by the addition of a few percent by weight of a non-ionic surfactant or an anionic surfactant into the solution of resin, the solution of resin with a relatively high viscosity can be used after the addition of such a surfactant.

The relationship between the concentration and the viscosity of the solution of resin and the impregnated and adhered amount of the resin to the basic material (in this case, craft paper) in cases of using the resin in the state of solution in an organic solvent is shown in Table 1 as follows:

TABLE 1

| Resin | Solvent | State of solution concentration* | viscosity** | Impregnated and adhered amount of resin to a sheet of craft paper*** A**** | B**** |
|---|---|---|---|---|---|
| Polystyrene | Dichloromethane | 10 | 350 ± 50 | 28.2 | 12 |
| | | 20 | 750 ± 50 | 53.9 | 26 |
| Polymethyl methacrylate | same as above | 10 | 150 ± 50 | 24.8 | 13 |
| | | 20 | 400 ± 50 | 49.3 | 24 |

Note:
*% by weight, cps at 20° C. and *% by weight
****A in the case where an excess solution was removed by lightly wiping the surface of the basic material after impregnating the basic material with the solution of resin. B in the case where such a wiping was carried out strongly.

In both cases, after evaporating the solvent off, the impregnated craft paper was weighed, and the difference between the weight of impregnated paper and the weight of not-yet impregnated paper divided by the weight of impregnated paper and multiplied by 100 is shown as the adhered amount of the resin into the basic material.

As is seen in Table 1, in cases where the solution containing 20% by weight of polystyrene or polymethyl methacrylate was impregnated, a predetermined amount of impregnated and adhered resin (20 to 65% by weight) was obtained by one treatment of impregnation, however, the solution containing 10% by weight of either of the resins could not give the predetermined amount of adhered resin by one treatment of impregnation.

Accordingly, in such a case, it is necessary to repeat the treatment of impregnation with the same solution or, to raise the concentration of the resin in the solution.

The viscosity of a 10% by weight of polystyrene solution in dichloromethane is nearly the same as that of a 20% by weight of polymethyl methacrylate solution in the same solvent, and accordingly, in the case of impregnating polystyrene, it is preferable to use its 10% by weight solution repeatedly for two or three times from the viewpoint of processability in impregnating. On the other hand, in the case of polymethyl methacrylate, it is preferable to use its 20% by weight solution, or a solution of a higher concentration may be used.

Besides, as is seen in Table 1, the values of A (obtained by weighing the impregnated, lightly wiped and dried paper) are in the range of the predetermined value of the amount of impregnated adhered resin to the basic material of 20 to 65% by weight, however, the state of adhesion of the resin was uneven and showed a relatively large lack of uniformity throughout the sheet. Accordingly, the evaluation of the impregnated material should be carried out on the value of B as in the present invention.

In the next case wherein the thermoplastic synthetic resin is used in a state of an aqueous emulsion, the paticles of the resin are reduced in size of smaller than one micrometer or preferably, smaller than 0.1 micrometer, and they are emulsified in water while using a surfactant or an emulsifier. Instead, an aqueous emulsion of the resin obtained by emulsion polymerization of the monomer of the resin, in which the resin is in a state of minute particles of size of 0.1 micrometer or less, may be used.

Since the viscosity of the aqueous emulsion of the thermoplastic synthetic resin does not show the large increase with the increase of its concentration as compared to the solution of the resin in the organic solvent, such an aqueous emulsion is applicable at a relatively high concentration of the resin.

The relationship between the concentration and the viscosity of the aqueous emulsion of the resin is shown in Table 2 while comparing to those of solution in organic solvent.

TABLE 2

| Resin | Concentration (% by weight) | Medium | State | viscosity (cps at 20° C.) |
|---|---|---|---|---|
| Polystyrene | 20 | $CH_2Cl_2$ | solution | 700 to 800 |
| | 10 | $CH_2Cl_2$ | solution | 300 to 400 |
| Polystyrene | 50 | water | emulsion | 100 |
| | 40 | water | emulsion | 40 |
| Polymethyl methacrylate | 20 | $CH_2Cl_2$ | solution | 350 to 450 |
| | 10 | $CH_2Cl_2$ | solution | 100 to 200 |
| Polymethyl methacrylate | 50 | water | emulsion | 100 |
| Polyvinyl chloride | 45 | water | emulsion | 300 |

As is seen in Table 2, the viscosity of an aqueous emulsion of a resin is substantially lower than that of a solution of the resin in an organic solvent in spite of the higher concentration of the resin in the emulsion than that in the solution.

In the present invention, the above-mentioned solution or aqueous emulsion of the thermoplastic synthetic resin is impregnated into the basic material such as sheets of paper or cloth and the solid amount of the resin adhered into the basic material by impregnation is 20 to 65% by weight of the weight of the impregnated material.

Papers for use as the basic material are, for instance, coated paper, craft paper, rolled paper, rice paper, paper for paper towel, etc., however, in order to raise the effecience of impregnation of the resin, the paper with a basis weight (unit of weight/area) as small as possible and without any sizing is preferable. The regenerated paper such as craft paper and newspaper is effectively utilized.

Cloth as the basic material includes cloths in various states such as Tenjiku (coarse cotton cloth), calico, thin canvas, etc. made of cotton, rayon staple or Vinylon ® (partially acetalized polyvinyl alcohol with formaldehyde), unwoven cloths comprising wood pulp or synthetic fibers and cloths comprising glass fibers and carbon fibers. Among them, cloths comprising glass fibers or carbon fibers are suitable particularly as the basic material in the case where polyarylate is used as the resin.

In order to impregnate the solution of resin or the aqueous emulsion of resin into these basic material to have the resin deposited into the basic material in an amount of 20 to 65% by weight of the thus impregnated material, various techniques may be adopted as follows:

In the case where the resin is used in a state of solution in an organic solvent, the basic material is pressed between a pair of rollers in the solution or the material is passed through the solution while strongly pressing and sliding the material onto a bar. By such a technique, the impermeability and impregnating capability of the solution of resin is possibly raised. The impregnation by pinching the material between rollers can be carried out in two stages by two pairs of rollers set in one vessel holding the solution of resin continuously, or it is carried out repeatedly by using a pair of rollers.

In the case where the concentration of the resin in the solution can not be raised because of the fear of reducing the impermeability of the solution due to the raised viscosity with the concentration as in the case where the concentration is controlled to be about 10% by weight, it is impossible to obtain the basic material loaded with a large amount, for instance, 40 to 65% by weight of impregnated and adhered resin as is seen in Table 1 by one treatment of impregnation. Accordingly, in such a case, it is preferable to dipping the once impregnated and half-dried material into the solution of resin. This treatment can be repeated until the desired amount of the resin is deposited into the basic material. In such technique, the impermeability of the solution to the basic material is improved, it is preferable in viewpoint of the processability. In addition, in such repeating technique, a method is effectively adopted in which more than two vessels containing respectively the solution different in the concentration of resin are provided, and the material is dipped in the solutions in respective vessels in regular succession corresponding to the higher concentrations.

In the case where the resin is used in a state of an aqueous emulsion, since the viscosity of the emulsion is not raised so much as the concentration of the resin in the emulsion, an emulsion of relatively high concentration can be used. Also in the case, owing to the absence of an organic solvent, there are advantages that there are no evolution of inflammable and noxious vapour of any organic solvent.

However, in the case where an aqueous emulsion of resin is impregnated into the basic material, there is a tendency that the solid resinous matter of the aqueous emulsion is not impregnated and adhered to the basic material in a sufficient amount.

In order to solve such a problem, it is preferable to use, in the case of impregnating sheets of paper, a paper of low density, of high porosity, without sizing and preferably less than 70 g/m$^2$ in a dried state as far as possible, namely, less than 5% by weight of moisture content, preferable less than 3% by weight. In addition, it is useful to solve the above-mentioned problem that the particles in the aqueous emulsion are reduced in size as far as possible, preferably to 0.1 micrometer or less. In connection to the technique, since the diameter of particles of resin formed by emulsion polymerization is 0.1 micrometer or less on the average, it is profitable to use the aqueous emulsion formed by emulsion polymerization of the monomer of the resin.

In order to impregnate the aqueous emulsion of resin into the basic material, the material may be immersed into the emulsion for a short period of time, for example, 60 sec, and the immersion carried out under pressure results in the increased amount of deposited resin. Such immersion under pressure is carried out by passing the basic material between a pair of rollers provided in a vessel holding the emulsion, or by passing the impregnated material between a pair of rollers just after taking the impregnated material from the emulsion of resin. Such an immersion under pressure by a pair of rollers may be carried out in two stages. In addition, the impregnated basic material obtained by impregnation under pressure not only has a larger amount of deposited resin as compared to the impregnated material obtained by mere immersion but also has a finer cross section and a better surface luster.

After impregnating the solution of resin or the aqueous emulsion of resin into the basic material, the material is subjected to drying. The temperature and the period of drying need not to be controlled different from the case of using thermosetting resin. Namely, in the case of using thermoplastic resin as the impregnating material, it is not necessary to promote or proceed the condensation as in the case of using thermosetting resin in a primary state in the step of drying. The drying is carried out for removing the organic solvent or moisture and accordingly, in summer, natural drying is carried out according to the kinds of resin and the solvent, for example, polyarylate dissolved in dichloromethane.

After drying the impregnated basic material, a plurality of the impregnated basic material are laminated and the laminate is pressed at a temperature higher than the melting point of the resin impregnated into the basic material, usually 50° to 100° C. at a pressure of higher than 20 kg/cm$^2$, preferably higher than 40 kg/cm$^2$. However, in cases of uniformal pressing at a usual pressure of 20 to 40 kg/cm$^2$, the strength of the laminate product obtained by the above-mentioned procedures is saturated and accordingly, the higher pressure than 40 kg/cm$^2$ is practically not necessary. Also the pressure is not necessary to be applied for a long period on the laminate.

In addition, in the process of lamination, after piling up a predetermined number of sheets of the basic material, to which a thermoplastic resin has been impregnated and adhered, only an application of heat to bring the impregnated and adhered resin on and/or in the sheets to a melted state makes the sheets mutually joined together en bloc instantly.

However, in practice, owing to the reasons of unevenness of the adhered state of the resin to the basic material, of the unevenness of the melt state of the resin and of the difficulty of piling up the sheets without leaving any gap between the sheets due to the incomplete flatness of each sheet, it is necessary to apply a pressure intentionally together with the applied heat in order to obtain the desired laminate articles.

Accordingly, the process of heating and pressing adopted in the present invention differs largely from the process and purpose of maintaining the heating and pressing in the shaping of laminate articles utilizing a thermosetting synthetic resin.

Just after the thus carried out-shaping, the united bodies are cooled to bring the temperature of the resin in and on the impregnated basic materials to a temperature of lower than its solidifying point, and then the pressure is released, the processed articles being removed from the press. The time between the beginning of applying the pressure and the removing the article from the press is usually less than a fraction of the time in the case of shaping the articles in which a thermosetting resin is used. Accordingly, the procedures of heating and pressing in the shaping of the laminate articles of the present invention are substantially different from those adopted in the shaping of laminated articles using a thermosetting synthetic resin.

In the shaping of the laminated articles of the present invention, it is possible to laminate a plurality of basic materials to which various different resins are respectively impregnated and deposited provided that the solubility of the resins is similar.

In addition, various additives such as colouring agents, plasticizers and non-inflammabling agents may be admixed with the solution or the emulsion of resin in accordance with the purposes of the laminate articles to be impregnated into the basic material. Furthermore, it is possible to use patterened or printed sheet of paper on one or both sides of the basic material.

Since the laminate articles prepared according to the procedures of the present invention have a structure en bloc in which each impregnated basic material is firmedly fixed mutually owing to the solidification of the impregnated and deposited resin, as well be shown by Examples later, their mechanical strength is excellent with a favorable processability, for instance, the laminate articles processed to be 2 mm in thickness are easily cut or cut out with scissors or a cutting knife, and are applicable for goods in a broad range such as general merchandise, office supplies, furnitures, materials for construction, mechanical parts, electroinsulating materials and the like.

Concerning the processability of the laminate articles according to the present invention, those of a relatively large thickness can be cut or drilled by using ordinary machine tools, and different from those composed solely of thermoplastic resin, no problems of melt-adhering and of becoming flabby owing to the friction heat occur, and accordingly, there are merits of obtaining precisely processed articles of accurate dimensions and of less damaging the edged tools as well as the easy processability.

In addition, the laminate articles of the present invention are easily sticked with each other or to the surfaces of other articles or bodies by the use of a usual adhesive for office use, home use or woodworking use. Besides, those of smaller thickness can be fixed by rivetting.

As has been explained above, the laminate articles according to the present invention have various excellent characteristics, and moreover, since the smoke which evolves by burning the wastes and cuttings of the laminate articles for disposal is small in amount and the heat of combustion of the laminate article is not so large as compared to that of the resin itself, there is a large practical merit of not damaging the incinerating furnace.

The present invention will be explained concretely while referring to non-limitative examples as follows:

EXAMPLE 1

A solution of polystyrene at a concentration of 20% by weight and a viscosity of 800 cps in dichloromethane was impregnated into a sheet of Kraft paper of a basis weight of 70 g/m$^2$ as the basic material, by passing the sheet between a pair of pressing rollers immersed in the solution of polystyrene to deposit polystyrene into and/or onto the sheet of Kraft paper through impregnation. The thus obtained impregnated sheet having deposited polystyrene was dried at a temperature of 50° C. The amount of polystyrene impregnated and adhered to the Kraft paper was 25% by weight of the finished paper.

Thirty sheets of the thus finished Kraft paper impregnated and adhered with polystyrene were laminated and after pressing them at a temperature of 150° C. for 3 sec under a pressure of 40 kg/cm$^2$, the laminate was cooled to room temperature. Each layer of the impregnated and adhered with polystyrene within the laminate thus prepared was firmly fixed to each other en bloc by the solidification of polystyrene, the total thickness of the laminate article being 4.0 mm.

The mechanical properties of the thus prepared laminate article are shown in Table 3 together with the mechanical properties of the article of 4.0 mm in thickness prepared by extruding and shaping polystyrene for comparison:

TABLE 3

| Specimen | Mechanical properties of Specimens | | |
| --- | --- | --- | --- |
| | Tensile strength (kg/cm$^2$) | Elongation at break (%) | Bending strength (kg/cm$^2$) |
| Laminate article according to the present invention | 750 | 0.9 to 1.5 | 1250 |
| A single sheet of polystyrene | 500 | 1.0 to 2.5 | 750 |

As is seen in Table 3, the mechanical properties of the laminate article according to the present invention were superior to those of the article consisting of a sheet of polystyrene.

EXAMPLE 2

Another laminate of 4.0 mm in thickness was prepared by using Kraft paper as the basic material in the same manner as in Example 1 except for using polyvinyl chloride as the thermoplastic synthetic resin. The mechanical properties of the thus prepared laminate were as follows:
Tensile strength (kg/cm$^2$): 800,
Elongation at break (%): 5 to 12 and
Bending strength (kg/cm$^2$): 1200.

EXAMPLE 3

Still another laminate of 4.0 mm in thickness was prepared by using Kraft paper as the basic material in the same manner as in Example 1 except for using polymethyl methacrylate as the thermoplastic synthetic resin. The mechanical properties of the thus prepared laminate were as follows:

Tensile strength (kg/cm$^2$): 1500,
Elongation at break (%): 1.5 to 4.0 and
Bending strength (kg/cm$^2$): 1650.

What is claimed is:

1. A process for preparing a laminate article with a thermoplastic synthetic resin impregnated thereinto or adhered thereto comprising:
   (a) immersing a plurality of sheets of basic material of paper or cloth into a solution of a thermoplastic synthetic resin dissolved in an organic volatile solvent thereby impregnating or adhering said thermoplastic synthetic resin into or onto said plurality of sheets of basic material, the concentration of the resin in said solution being in the range of 10 to 30% by weight and the viscosity of the solution being lower than 1000 cps, said thermoplastic synthetic resin being selected from the group consisting of polystyrene, copolymers of styrene and acrylonitrile, polymers of esters of methacrylic acid, polyacrylate, polycarbonate, polyvinyl chloride, copolymers of vinyl chloride and vinyl acetate, polyvinyl acetate, polyvinyl butyral and cellulose acetate,
   (b) drying the thus obtained impregnated sheets of basic material, thereby producing sheets of basic material containing thermoplastic synthetic resin impregnated therein or adhered thereto in an amount of 20 to 65%, based on the weight of the sheets,
   (c) laminating together a plurality of the thus dried sheets of basic material,
   (d) pressing the laminated sheets under a pressure of higher than 20 kg/cm$^3$ at a temperature of higher by 50° to 100° C. than the melting point of said thermoplastic synthetic resin, and
   (e) cooling said laminated sheets,
   thereby obtaining a laminate article comprising firmly fixed sheets of the basic material impregnated with or having adhered thereto said thermoplastic synthetic resin.

2. A process according to claim 1, wherein said volatile organic solvent is selected from the group consisting of benzene, chlorobenzene, toluene, dichloromethane, trichloroethylene, acetone, ethyl methyl ketone, methyl acetate, ethyl acetate, methanol and isopropyl alcohol.

3. A process according to claim 2 or 1, wherein the immersion of said plurality of sheets of basic material into said solution or said emulsion of said thermoplastic synthetic resin is carried out repeatedly more than one times.

* * * * *